US011095700B2

(12) United States Patent
Oyama et al.

(10) Patent No.: US 11,095,700 B2
(45) Date of Patent: Aug. 17, 2021

(54) MANAGEMENT SERVER, CONTENT MANAGEMENT METHOD, AND CONTENT MANAGEMENT PROGRAM FOR CACHING CONTENT IN AN ACCESS POINT

(71) Applicant: TOSHIBA MEMORY CORPORATION, Tokyo (JP)

(72) Inventors: Yuichiro Oyama, Ota Tokyo (JP); Takeshi Ishihara, Yokohama Kanagawa (JP); Hiroshi Nishimoto, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/288,110

(22) Filed: Feb. 28, 2019

(65) Prior Publication Data

US 2019/0289053 A1 Sep. 19, 2019

(30) Foreign Application Priority Data

Mar. 15, 2018 (JP) .............................. JP2018-048465

(51) Int. Cl.
*H04L 29/06* (2006.01)
*H04W 8/00* (2009.01)
(Continued)

(52) U.S. Cl.
CPC ............ *H04L 65/602* (2013.01); *H04L 65/80* (2013.01); *H04L 67/2842* (2013.01); *H04W 8/005* (2013.01); *H04W 64/003* (2013.01)

(58) Field of Classification Search
CPC ... H04L 65/602; H04L 65/80; H04L 67/2842; H04L 67/2847; H04W 8/005; H04W 64/003
(Continued)

(56) References Cited

U.S. PATENT DOCUMENTS 7,221,947 B2 * 5/2007 Casey ................... H04L 67/306
455/418
9,462,462 B2 * 10/2016 Casey .................... G01C 21/20
(Continued)

FOREIGN PATENT DOCUMENTS

JP 2015-031987 A 2/2015
JP 2016-128958 A 7/2016
JP 2016128958 A * 7/2016

OTHER PUBLICATIONS

Roth, Volker, Wolfgang Polak, Eleanor Rieffel, and Thea Turner. "Simple and effective defense against evil twin access points." In Proceedings of the first ACM conference on Wireless network security, pp. 220-235. 2008. (Year: 2008).*

*Primary Examiner* — Abdulkader M Alriyashi
(74) *Attorney, Agent, or Firm* — Foley & Lardner LLP

(57) ABSTRACT

A management server includes a processor and a storage that stores correlation information in which a category into which content is classified, location information, and an access frequency are correlated with one another. The processor acquires access information on an access from a wireless terminal to a content server via an access point and a network, a content requested by the wireless terminal, and location information corresponding to the accessed access point, updates the correlation information by rewriting the access frequency corresponding to a category to which the requested content belongs and the acquired location information, according to the access information, specifies a category and location information such that an access frequency related to the category and location information in the updated correlation information satisfies a criterion, and stores a content belonging to the category in a cache area of an access point corresponding to the location information.

20 Claims, 12 Drawing Sheets

(51) Int. Cl.
*H04W 64/00* (2009.01)
*H04L 29/08* (2006.01)

(58) Field of Classification Search
USPC .................................................. 709/217, 231
See application file for complete search history.

(56) References Cited

U.S. PATENT DOCUMENTS

| | | | |
|---|---|---|---|
| 2007/0015517 A1* | 1/2007 | Casey ................... | H04L 67/306 455/456.1 |
| 2013/0066936 A1* | 3/2013 | Krishnan .............. | H04L 67/289 709/201 |
| 2014/0179301 A1* | 6/2014 | Harris ................. | H04L 67/2852 455/422.1 |
| 2014/0207912 A1* | 7/2014 | Thibeault ............ | H04L 67/2847 709/219 |
| 2014/0237071 A1* | 8/2014 | Friman ............... | H04L 67/2847 709/216 |
| 2018/0288453 A1* | 10/2018 | Schmidt ............... | H04L 65/602 |

* cited by examiner

| 15a | 15b |
|---|---|
| TERMINAL ID | CONTENT CATEGORY |
| IPA1 | A |
| IPA2 | B |
| IPA3 | C |
| ⋮ | ⋮ |

| 31a | 31b |
|---|---|
| TERMINAL ID | LOCATION INFORMATION |
| IPA1 | AP1 |
| IPA2 | AP3 |
| IPA3 | AP2 |
| ⋮ | ⋮ |

FIG. 14A

| CONTENT CATEGORY | LOCATION INFORMATION | USER ATTRIBUTE | ACCESS FREQUENCY |
|---|---|---|---|
| A | AP1 | a | $N_{A1a}$ |
| A | AP1 | b | $N_{A1b}$ |
| A | AP1 | c | $N_{A1c}$ |
| A | AP2 | a | $N_{A2a}$ |
| A | AP2 | b | $N_{A2b}$ |
| A | AP2 | c | $N_{A2c}$ |
| A | AP3 | a | $N_{A3a}$ |
| A | AP3 | b | $N_{A3b}$ |
| A | AP3 | c | $N_{A3c}$ |
| B | AP1 | a | $N_{B1a}$ |
| B | AP1 | b | $N_{B1b}$ |
| B | AP1 | c | $N_{B1c}$ |
| B | AP2 | a | $N_{B2a}$ |
| B | AP2 | b | $N_{B2b}$ |
| B | AP2 | c | $N_{B2c}$ |
| B | AP3 | a | $N_{B3a}$ |
| B | AP3 | b | $N_{B3b}$ |
| B | AP3 | c | $N_{B3c}$ |
| C | AP1 | a | $N_{C1a}$ |
| C | AP1 | b | $N_{C1b}$ |
| C | AP1 | c | $N_{C1c}$ |
| C | AP2 | a | $N_{C2a}$ |
| C | AP2 | b | $N_{C2b}$ |
| C | AP2 | c | $N_{C2c}$ |
| C | AP3 | a | $N_{C3a}$ |
| C | AP3 | b | $N_{C3b}$ |
| C | AP3 | c | $N_{C3c}$ |

FIG. 14B

| DISTRIBUTION DESTINATION | CONTENT CATEGORY | DISTRIBUTION TIME |
|---|---|---|
| AP1 | A | $t_{11} \sim t_{12}$ |
| AP2 | A, B | $t_{13} \sim t_{14}$ |
| AP3 | C | $t_{15} \sim t_{16}$ |

MANAGEMENT SERVER, CONTENT MANAGEMENT METHOD, AND CONTENT MANAGEMENT PROGRAM FOR CACHING CONTENT IN AN ACCESS POINT

CROSS-REFERENCE TO RELATED APPLICATION

This application claims the benefit of and priority to Japanese Patent Application No. 2018-048465, filed Mar. 15, 2018, the entire contents of which are incorporated herein by reference.

FIELD

Embodiments described herein relate generally to a management server, a content management method, and a content management program.

BACKGROUND

Content of a wireless terminal accessible to an access point is distributed from a server via a network and the access point. At this time, efficient distribution of the content remains desired.

DESCRIPTION OF THE DRAWINGS

FIG. 3A and FIG. 3B are diagrams illustrating data structures of a category information list and a location information list according to the embodiment.

FIG. 12A and FIG. 12B are diagrams illustrating configurations of first correlation information and distribution management information according to a second modification example of the embodiment.

FIG. 14A and FIG. 14B are diagrams illustrating configurations of first correlation information and distribution management information according to a third modification example of the embodiment.

DETAILED DESCRIPTION

Figure 1:
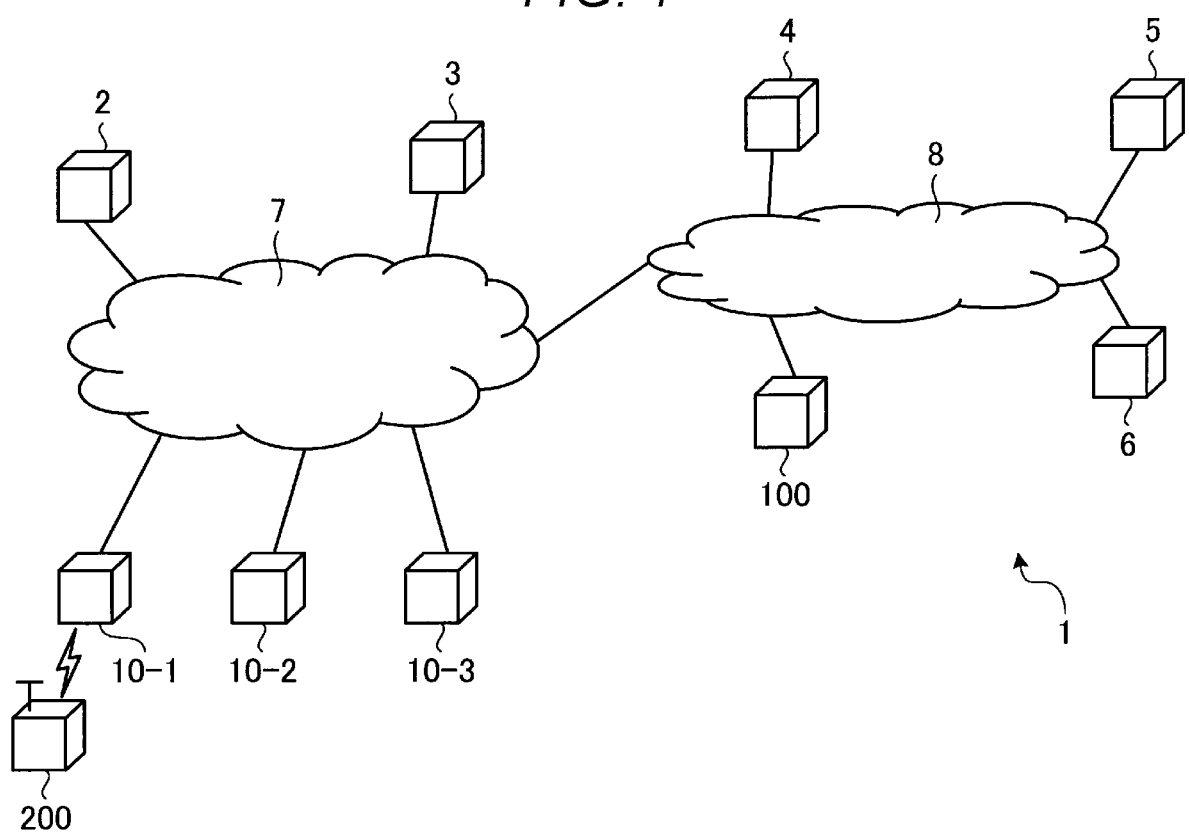
FIG. 1 is a diagram illustrating a configuration of a system including a management server according to an embodiment.

Embodiments provide a management server, a content management method, and a content management program which can efficiently distribute content.

In general, according to one embodiment, a management server including a storage unit, an acquisition unit, and a processing unit may be provided. The storage unit may store first correlation information in which a category into which content is classified, location information, and an access frequency are correlated with a plurality of categories and a plurality of pieces of location information. The acquisition unit may acquire access information which is accessed from a wireless terminal to a content server via an access point and a network, content which is requested by the wireless terminal, and location information corresponding to the accessed access point. The processing unit may update the first correlation information by rewriting the access frequency corresponding to the category to which the requested content belongs and the acquired location information, according to the access information. The processing unit may specify a category and location information in which an access frequency of the updated first correlation information satisfies a criterion. The processing unit may store content belonging to the specified category in a cache area of the access point corresponding to the specified location information.

Hereinafter, a management server according to an embodiment will be described in detail with reference to the accompanying drawings. The present disclosure is not limited by the embodiment described herein.

The management server according to the embodiment can manage a distribution of content and can manage the content distributed from the management server to a wireless terminal via a network and an access point. At this time, there is a need for improvement in efficiently distributing the content.

In order to efficiently distribute the content, it is possible to consider a method of determining whether or not the content is disposed in the access point, based on a distribution history of distributing the content to the wireless terminal. In the method, the content frequently distributed to the wireless terminal may be disposed to the access point currently accessed by the wireless terminal. In the method, in determining, based on the distribution history of distributing the content to the wireless terminal, whether or not the content can be disposed in the access point, it is difficult to deal with a case where there is no distribution history of the wireless terminal such as when a new wireless terminal moves. Thereby, even if the content is frequently browsed depending on a location where the access point is disposed, distribution of the content to the access point may be delayed, and it may be difficult to speed up the distribution of the content.

For example, when an infrastructure and a service are operated by different operators, because information is easily divided, it is difficult to effectively target a location-dependent content, and it may happen that an advertisement is issued to time and a place where a target user is not present. Since cost for an execution environment of the advertisements and the service may be incurred, it is preferable to efficiently (for example, to be optimized) distribute the content.

Therefore, in the embodiment, the management server may store first correlation information in which a category of the content, location information, and an access frequency are correlated with each other, sequentially update the first correlation information according to access information to the content, and store content that is expected to be accessed according to the first correlation information in a cache area of the access point corresponding to the location information, and thereby, it is possible to efficiently distribute the content.

Specifically, a system including the management server can manage information (e.g., location information on a distribution destination) of a location to which the content will be distributed at a location (e.g., location of an access point) which may be finer than a wireless location information technology can do. If a system can grasp or determine the location information of the distribution destination instead of location of the wireless terminal, it is possible for the system to easily determine where to distribute the content. Given this fact, the management server may classify the contents into categories from similarity, and when disposing new content, the management server may add the new content because of the similarity to the existing category and disposes the new content to the access point where the content of the category is located. That is, the management server may gather necessary information from a server that manages each piece of information, classify the content into categories, and obtain an access point with a high possibility of referring to the new content to disposes the new content thereto. Thereby, the new content may be disposed early in the access point with a high possibility of being referred to, and the whole system can be improved in distribution quality.

More specifically, a system 1 including the management server 100 may be configured as illustrated in FIG. 1. FIG. 1 is a diagram illustrating a configuration of the system 1 including the management server 100.

The system 1 may include an authentication server 2, a location information management server 3, a cache server 4, a domain name system (DNS) server 5, an origin server 6, a plurality of access points 10-1 to 10-3, a wireless terminal 200, and the management server 100.

The plurality of access points 10-1 to 10-3, the authentication server 2, and the location information management server 3 may be communicably connected to each other via the network 7. The network 7 may be a local area network (LAN), for example, wireless LAN (WLAN).

The cache server 4, the DNS server 5, the origin server 6, and the management server 100 may be communicably connected to each other via a network 8. The network 8 may be a network (WAN) in a wider range than the network 7, and may be, for example, the Internet. The network 8 and the network 7 may be connected to each other.

The wireless terminal 200 can communicate with an access point 10 in a communicable range among the plurality of access points 10-1 to 10-3 via a wireless communication. FIG. 1 illustrates a case in which the wireless terminal 200 is not provided in the communicable range of the access points 10-2 and 10-3 but is provided in the communicable range of the access point 10-1 and is communicable with the access point 10-1.

Figure 2:
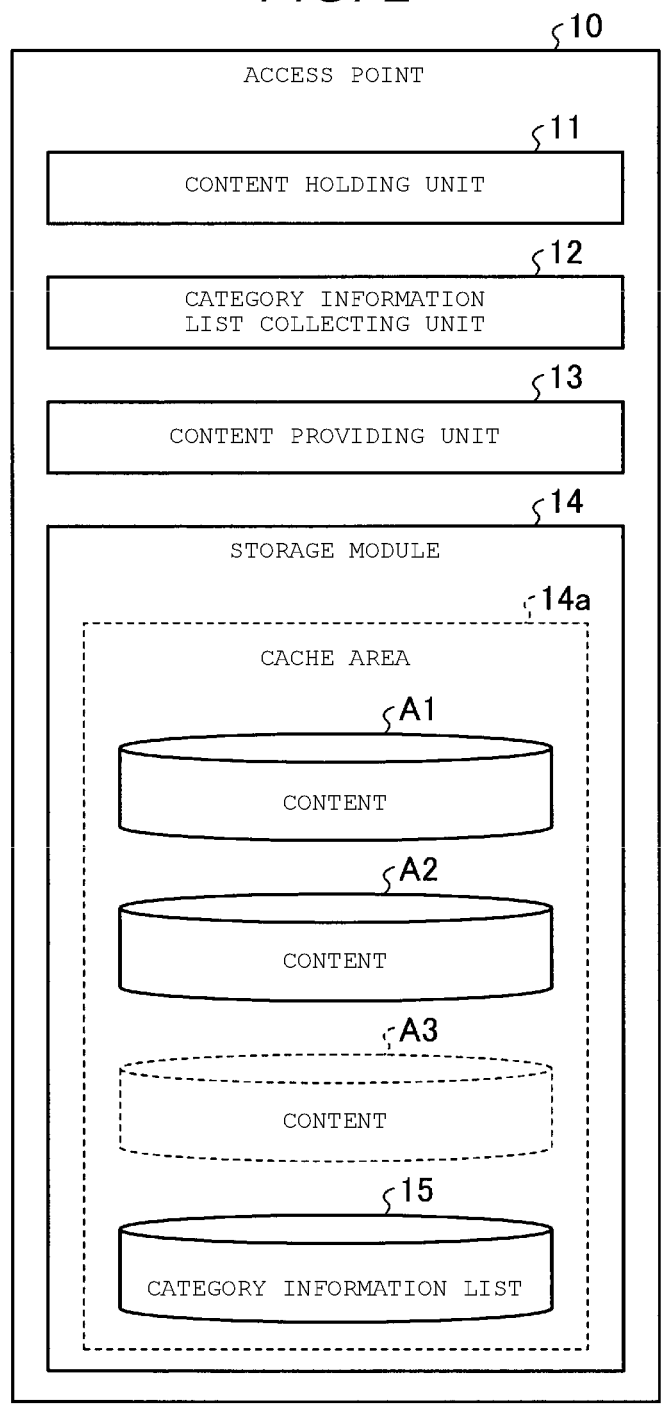
FIG. 2 is a diagram illustrating a configuration of an access point according to the embodiment.

Each access point 10 can communicate with another communication node via the networks 7 and 8. As illustrated in FIG. 2, the access point 10 may include a content holding unit 11, a category information list collecting unit 12, a content providing unit 13, and a storage module 14. At least a portion of the content holding unit 11, the category information list collecting unit 12 and the content providing unit 13 may be implemented with a special circuit (e.g., circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like. The storage module 14 may be implemented with EPROM, EEPROM, SDRAM, and flash memory devices, CD ROM, DVD-ROM, or Blu-Ray® discs and the like. In the storage module 14, at least a part of a storage area can be used as a cache area 14a. The cache area 14a may be an area in which information can be temporarily stored.

The content holding unit 11 may receive the content and a content holding request from the outside (for example, the management server 100) via the networks 7 and 8. The content holding unit 11 may hold the requested content, based on the received content holding request. For example, if the content holding unit 11 receives content A3 and a content holding request thereof via the networks 7 and 8 in a state where content A1 and content A2 indicated by a solid line in FIG. 2 are stored in the cache area 14a, the content A3 indicated by a broken line in FIG. 2 may be additionally stored in the cache area 14a.

The category information list collecting unit 12 may collect an ID of the wireless terminal 200 and the content accessed by the wireless terminal 200. The category information list collecting unit 12 can extract the ID of the wireless terminal 200 from a header in the communication information when the access point 10 is accessed from the wireless terminal 200, can extract information indicated in the contents from body information in the communication information, and can collect the ID of the wireless terminal 200 and the content accessed by the wireless terminal 200.

At this time, the category information list collecting unit 12 can transmit a request regarding a category of the collected content to the management server 100 via the networks 7 and 8. If the request is received, the management server 100 may obtain the degree of similarity of the content to each of the prescribed categories A, B, and C, assign the category with the highest similarity to the content, and transmit the result to the access point 10 via the networks 7 and 8. The category information list collecting unit 12 may create or update a category information list 15 according to the assignment result of the category regarding the content. The category information list collecting unit 12 may store the created or updated category information list 15 in the cache area 14a.

The category information list 15 may have, for example, a data structure illustrated in FIG. 3A. FIG. 3A is a diagram illustrating the data structure of the category information list 15. The category information list 15 may include a terminal ID column 15a and a content category column 15b. In the terminal ID column 15a, IDs of the wireless terminals may be recorded, and for example, IP addresses IPA1, IPA2, IPA3, and the like may be recorded. In the content category column 15b, categories assigned to contents may be recorded, and for example, categories A, B, C, and the like may be recorded.

The category information list collecting unit 12 illustrated in FIG. 2 may receive a collection information acquisition request from the outside (for example, the management server 100) via the networks 7 and 8. The category information list collecting unit 12 may transmit the ID of the wireless terminal 200 and information on the category of contents to the outside (for example, the management server 100) via the networks 7 and 8 in response to the collection information acquisition request. The ID of the wireless terminal 200 may be an identifier that can uniquely identify the wireless terminal 200, such as a media access control (MAC) address of the wireless terminal 200 or an internet protocol (IP) address of the wireless terminal 200.

If a browsing request of the content is received from the wireless terminal 200, the content providing unit 13 may access the cache area 14a. If the content designated by the browsing request is cached in the cache area 14a, the content providing unit 13 may read the content from the cache area 14a and transmit the read content to the wireless terminal 200. When a capacity of the storage module 14 is insufficient, the content providing unit 13 may remove the content having the smallest number of accesses from among the contents stored in the cache area 14a.

The location information management server 3 may hold a location information list 31 including the ID of the wireless terminal 200 and the location information of the wireless terminal 200. The location information management server 3 can estimate the location information of the wireless terminal 200, based on at least one of the information obtained by a function of the global positioning system (GPS) and the information of the access point 10 (10-1 in a case of FIG. 1) to which the wireless terminal 200 is connected, and can create the location information list 31.

The location information list 31 may have, for example, a data structure illustrated in FIG. 3B. FIG. 3B is a diagram illustrating a data structure of the location information list 31. The location information list 31 may include a terminal ID column 31a and a location information column 31b. In the terminal ID column 31a, the ID of the wireless terminal may be recorded, and for example, the IP addresses IPA1, IPA2, IPA3, and the like may be recorded. In the location information column 31b, information indicating a location of the wireless terminal may be recorded, and, for example, identifiers AP1, AP2, AP3, and the like of access points accessed by the wireless terminal may be recorded. The identifier AP1 is an identifier of the access point 10-1, the identifier AP2 is an identifier of the access point 10-2, and the identifier AP3 is an identifier of the access point 10-3.

If a location information list request is received from the outside (for example, the management server 100), the location information management server 3 illustrated in FIG. 1 may transmit the location information list 31 to the outside (for example, the management server 100) via the network 7 and 8 in response to the location information list request.

Figure 4:
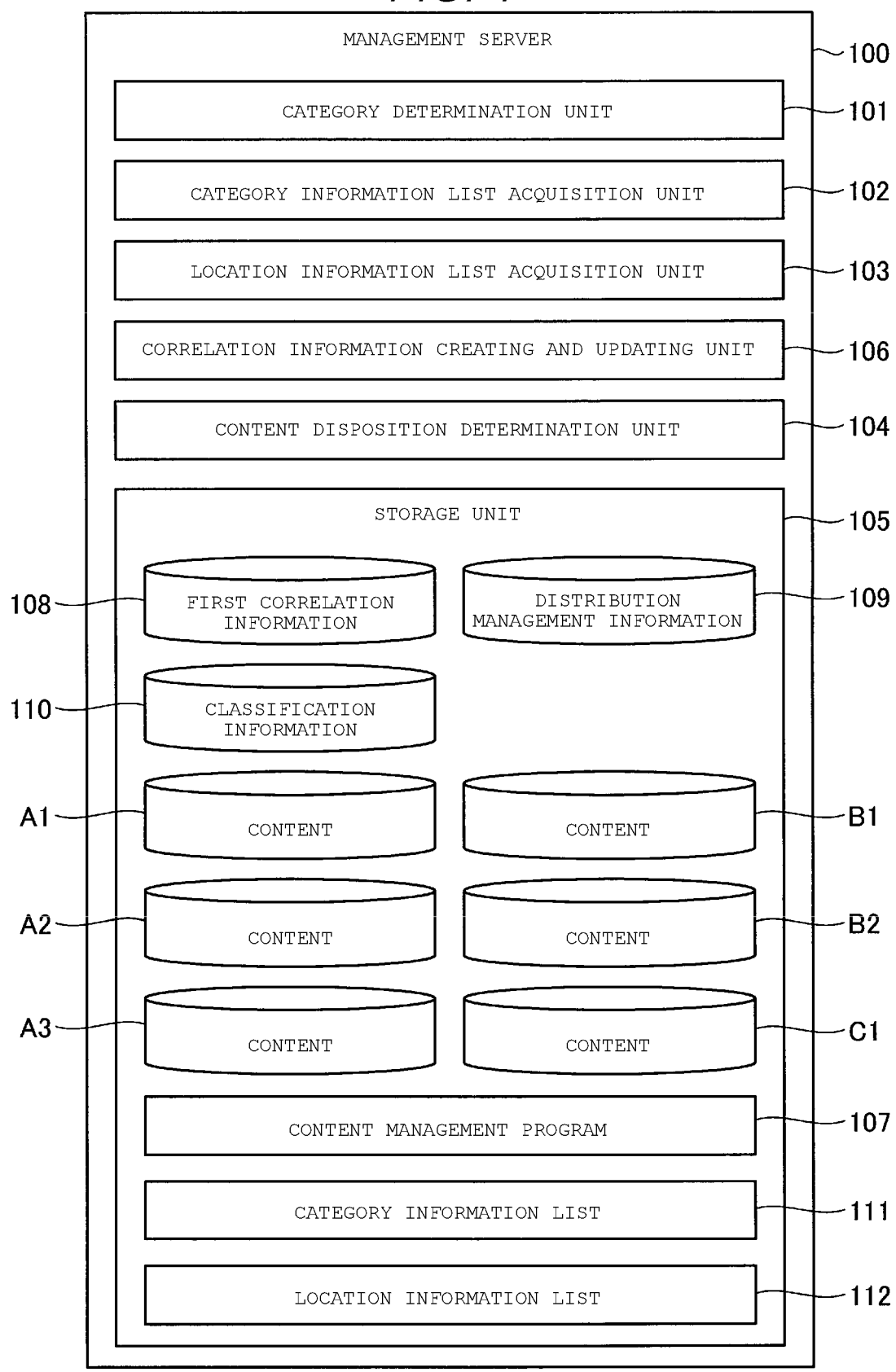
FIG. 4 is a diagram illustrating a configuration of the management server according to the embodiment.

The management server 100 can communicate with other communication nodes via the networks 7 and 8. A content management program 107 may be stored in the storage unit 105, and the management server 100 can perform a management process of the content according to the content management program 107. As illustrated in FIG. 4, the management server 100 may include a category determination unit 101, a category information list acquisition unit 102, a location information list acquisition unit 103, a content disposition determination unit 104, and a storage unit 105. At least a portion of the category determination unit 101, the category information list acquisition unit 102, the location information list acquisition unit 103, the content disposition determination unit 104, and the content management program 107 may be implemented with a special circuit (e.g., circuitry of a FPGA or the like), a subroutine in a program stored in memory (e.g., EPROM, EEPROM, SDRAM, and flash memory devices, CD ROM, DVD-ROM, or Blu-Ray® discs and the like) and executable by a processor (e.g., CPU, GPU and the like), or the like. The storage unit 105 may be implemented with EPROM, EEPROM, SDRAM, and flash memory devices, CD ROM, DVD-ROM, or Blu-Ray® discs and the like.

The category determination unit 101 may determine a category of the content from an attribute of the content and a predetermined policy. If a category request for the content is received, the category determination unit 101 may determine the degree of similarity of the content to each of the prescribed categories A, B, and C from the attribute of the content, based on the attribute (e.g., content, reproduction time, and the like), assign the category with the highest similarity to the content, and transmit the result to the access point 10 that sent the request. In addition, the category determination unit 101 may create or update the assignment result of the category for the content as the classification information 110.

Figure 5:
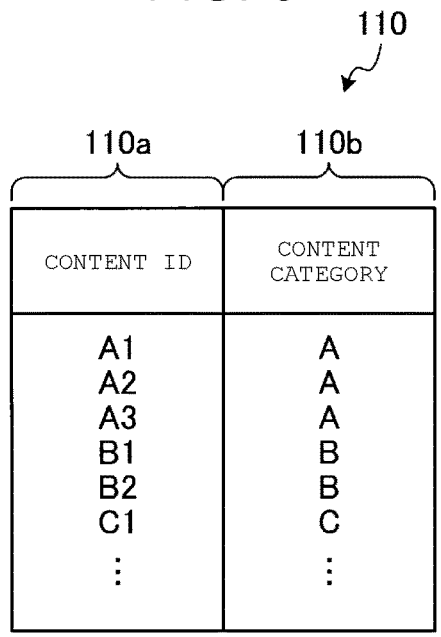
FIG. 5 is a diagram illustrating a data structure of classification information according to the embodiment.

The classification information 110 may have, for example, a data structure illustrated in FIG. 5. FIG. 5 is a diagram illustrating the data structure of the classification information 110. The classification information 110 may include a content ID column 110a and a content category column 110b. In the content ID column 110a, information for specifying the content may be recorded, and, for example, identifiers A1, A2, A3, B1, B2, C1, and the like of the content may be recorded. In the content category column 109b, categories assigned to the contents may be recorded, and, for example, the categories A, B, C, and the like may be recorded. Categories corresponding to each content can be specified with reference to the classification information 110. The contents A1, A2, and A3 may correspond to the category A, the contents B1 and B2 may correspond to the category B, and the content C1 may corresponds to the category C.

The category information list acquisition unit 102 may collect terminal IDs for each access point 10 and a category history which is an access destination category. That is, the category information list acquisition unit 102 may transmit a collection information acquisition request to the respective access points 10 via the networks 7 and 8, and receive the category information list 15 from the respective access points 10 via the networks 7 and 8. The category information list acquisition unit 102 may store the category information list 15 in the storage unit 105 as a category information list 111 in association with the identifiers for each of the access points 10-1 to 10-3.

The location information list acquisition unit 103 may acquire the location information list 31 from the location information management server 3. That is, the location information list acquisition unit 103 may transmit the location information list request to the location information management server 3 via the networks 7 and 8, and receive the location information list 31 from the location information management server 3 via the networks 7 and 8. The location information list acquisition unit 103 may store the location information list 31 in the storage unit 105 as the location information list 112.

A correlation information creating and updating unit 106 may acquire access information from the origin server 6 and/or the cache server 4. That is, with respect to content that is not accessed immediately before, the origin server 6 may transmit the content in response to a browsing request of the content transmitted to the origin server 6, and at this time, the content may be also transmitted to the cache server 4 so as to be cached. Accordingly, the browsing request of the content for the content that is accessed immediately before may be transmitted from the origin server 6 to the cache server 4, and the content may be transmitted from the cache server 4. Accordingly, each of the origin server 6 and the cache server 4 may hold a plurality of contents and hold access information (e.g., log information) to the contents. The access information (e.g., log information) may be information in which the terminal ID, and route information (e.g., the identifier of the access point, and the like) are recorded for each communication time.

The correlation information creating and updating unit 106 may create or update first correlation information 108 according to the access information (e.g., log information). That is, the correlation information creating and updating unit 106 may access the storage unit 105. If the first correlation information 108 is not stored, the correlation information creating and updating unit 106 may determine that the first correlation information 108 is not created yet, and create the first correlation information 108, based on the access information (e.g., log information), the location information list 112, and the category information list 111 of each access point 10-1 to 10-3. The correlation information creating and updating unit 106 may access the storage unit 105. If the first correlation information 108 is stored, the correlation information creating and updating unit 106 may determine that the first correlation information 108 has been previously created, and update the first correlation information 108, based on the access information (e.g., log information), and the location information list 112, and the category information list 111 of each of the access points 10-1 to 10-3.

Figure 6A:
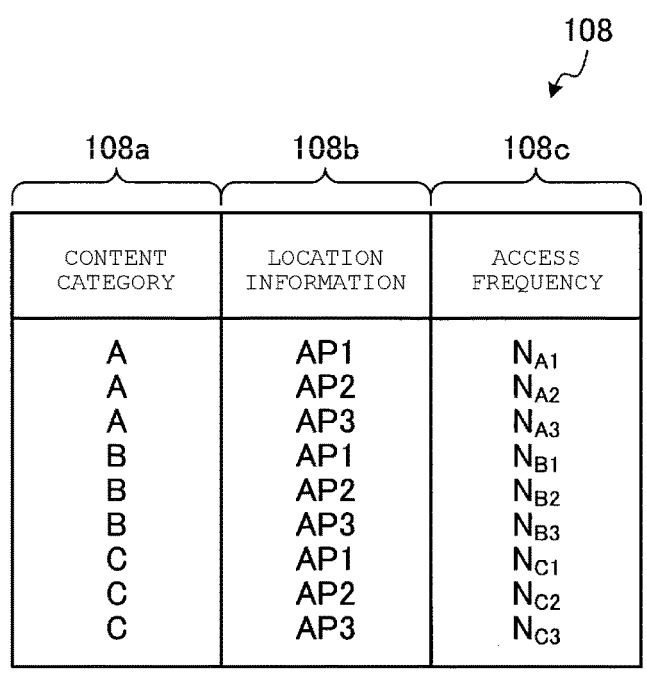
FIG. 6A and FIG. 6B are diagrams illustrating data structures of first correlation information and distribution management information according to the embodiment.

The first correlation information 108 may have, for example, a data structure illustrated in FIG. 6A. FIG. 6A is a diagram illustrating the data structure of the first correlation information 108. The first correlation information 108 may include a content category column 108*a*, a location information column 108*b*, and an access frequency column 108*c*. In the content category column 108*a*, categories assigned to the content may be recorded, and, for example, the categories A, B, C, and the like may be recorded. In the location information column 108*b*, information indicating a location of the wireless terminal may be recorded, and, for example, the identifiers AP1, AP2, AP3, and the like of access points accessed by the wireless terminal may be recorded. The identifier AP1 is an identifier of the access point 10-1, the identifier AP2 is an identifier of the access point 10-2, and the identifier AP3 is an identifier of the access point 10-3. In the access frequency column 108*c*, a value obtained by aggregating the number of accesses for each combination of the content category and the location information may be recorded. By referring to the first correlation information 108, it is possible to grasp or determine an access frequency (e.g., the number of times of accesses) corresponding to each combination of the content category and the location information. For example, referring to FIG. 6A, it is possible to grasp or determine that the access frequency for a combination of the content category A and the location information AP1 is $N_{A1}$ (times), and the access frequency for a combination of the content category C and the location information AP3 is $N_{C3}$ (times).

The correlation information creating and updating unit 106 illustrated in FIG. 4 may store the first correlation information 108 which is created or updated in the storage unit 105.

The content disposition determination unit 104 may determine to which access point the content can be disposed based on the category of the content, the access information, and the location information of the terminal. That is, the content disposition determination unit 104 may access the storage unit 105 and acquire the first correlation information 108. The content disposition determination unit 104 may determine a category and location information such that the access frequency in the first correlation information 108 satisfies a criterion.

Examples of the criterion include a criterion that the access frequency exceeds a threshold or a criterion that the access frequency enters into a predetermined high rank for each location, but any criterion can be adopted as long as the criterion is determined such that content in which an access frequency is high is disposed at a location where access frequency is high.

For example, when the criterion that the access frequency exceeds the threshold is adopted, if the access frequency $N_{A1}$ exceeds the threshold and the access frequencies $N_{B1}$ and $N_{C1}$ are equal to or less than the threshold in the first correlation information 108 illustrated in FIG. 6A, the category A may satisfy the criterion with respect to the content to be distributed to the access point 10-1 corresponding to the location information AP1. If the access frequency $N_{B2}$ exceeds the threshold and the access frequencies $N_{A2}$ and $N_{C2}$ are equal to or less than the threshold, the category B may satisfy the criterion with respect to the content to be distributed to the access point 10-2 corresponding to the location information AP2. If the access frequency $N_{C3}$ exceeds the threshold and the access frequencies $N_{A3}$ and $N_{B3}$ are equal to or less than the threshold, the category C may satisfy the criterion with respect to the content to be distributed to the access point 10-3 corresponding to the location information AP3.

Alternatively, when the criterion that the access frequency becomes a first rank for each location is adopted, if $N_{A1} > N_{B1} > N_{C1}$ in the first correlation information 108 illustrated in FIG. 6A, the category A may satisfy the criterion with respect to the content to be distributed to the access point 10-1 corresponding to the location information AP1. If $N_{B2} > N_{A2} > N_{C2}$, the category B may satisfy the criterion with respect to the content to be distributed to the access point 10-2 corresponding to the location information AP2. If $N_{C3} > N_{A3} > N_{B3}$, the category C may satisfy the criterion with respect to the content to be distributed to the access point 10-3 corresponding to the location information AP3.

The content disposition determination unit 104 illustrated in FIG. 4 may generate the distribution management information 109 according to the result of specifying the category and the location information such that the access frequency satisfies the criterion.

Figure 6B:
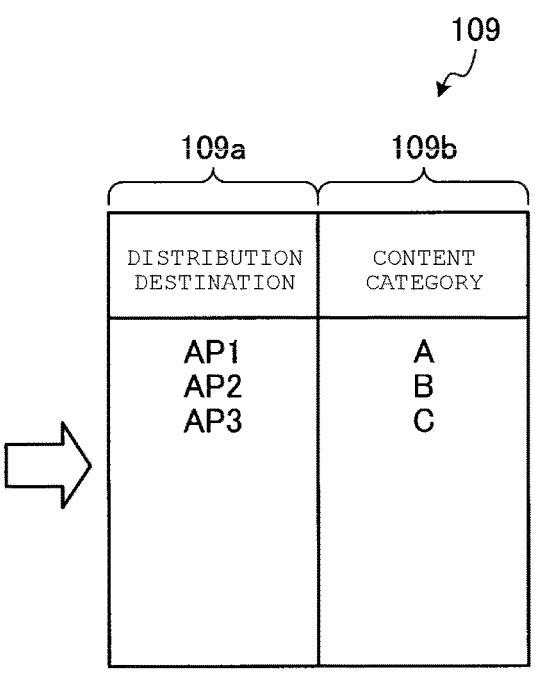

The distribution management information 109 may hve, for example, a data structure illustrated in FIG. 6B. FIG. 6B is a diagram illustrating the data structure of the distribution management information 109. The distribution management information 109 may include a distribution destination column 109*a* and a content category column 109*b*. In the distribution destination column 109*a*, the location information of the distribution destination may be recorded, and, for example, the identifiers AP1, AP2, AP3, and the like of the access points may be recorded. The identifier AP1 is the identifier of the access point 10-1, the identifier AP2 is the identifier of the access point 10-2, and the identifier AP3 is the identifier of the access point 10-3. In the content category column 109*b*, categories assigned to contents may be recorded, and, for example, the categories A, B, C, and the like may be recorded.

The content disposition determination unit 104 illustrated in FIG. 4 may store the distribution management information 109 in the storage unit 105, and store the content belonging to the category specified in the cache area 14a of the access point 10 corresponding to the specified location information according to the distribution management information 109.

The storage unit 105 may store the content management program 107. In addition, the storage unit 105 can store the category information list 111, the location information list 112, the first correlation information 108, and the distribution management information 109 according to a progress of the content management process. In addition, the storage unit 105 can store the content A1, A2, A3, B1, B2, and C1 as candidates to be distributed.

The respective servers illustrated in FIG. 1 may be configured as separate elements but may be configured with one element having functions of a plurality of elements, and a function of one element may be divided into a plurality of elements.

Next, an operation of the management server 100 when new content is added will be described with reference to FIG. 7A to FIG. 7D. FIG. 7A to FIG. 7D are diagrams illustrating the operation of the management server 100.

Initially, it is assumed that each communication node is in a state where a connection is established and communication is possible. In addition, it is assumed that categories are set according to classification policies such as a pre-set contents type and reproduction time.

Figure 7A:
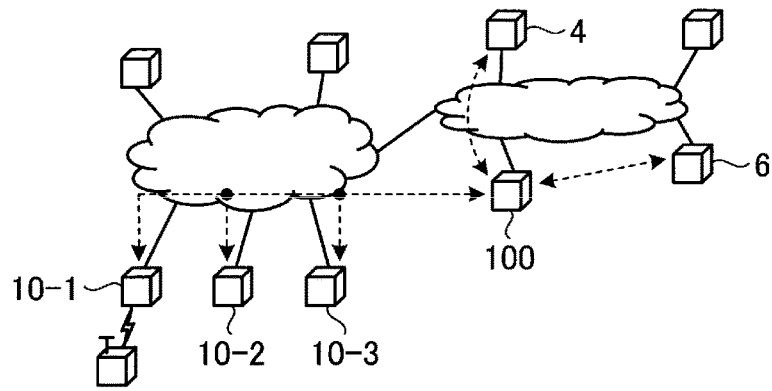
FIG. 7A to FIG. 7D are diagrams illustrating an operation of the management server according to the embodiment.

As illustrated in FIG. 7A, the management server 100 may perform a category information list collection operation. That is, as indicated by a dashed line arrow in FIG. 7A, the category information list acquisition unit 102 may request all the access points 10-1 to 10-3 to send the category information list 15 which is an access destination category for each terminal ID and acquire the category information list. If the acquisition of all the category information lists 15 is completed, the management server 100 may collectively hold the acquired category information list as the category information list 111. In addition, the management server 100 may acquire new content A3 and access information from the origin server 6 and/or the cache server 4 and may store the acquired content and access information in the storage unit 105. The correlation information creating and updating unit 106 may create or update the first correlation information 108 according to the access information (e.g., log information). The correlation information creating and updating unit 106 may store the first correlation information 108 which is created or updated in the storage unit 105.

Figure 7B:
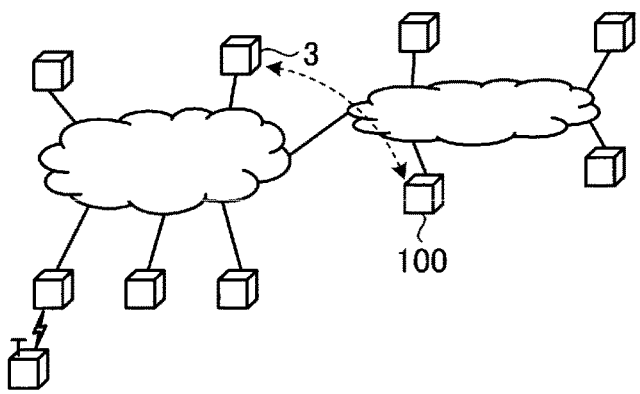

As illustrated in FIG. 7B, the management server 100 may perform a location information collection operation. That is, as indicated by a dashed line arrow in FIG. 7B, the location information list acquisition unit 103 may request the location information management server 3 to send the location information list 31 of all the terminals and may acquire the location information list. Next, if the acquisition of all the location information lists 31 is completed, all the location information lists may be collectively held as the entire location information list 112.

Figure 7C:
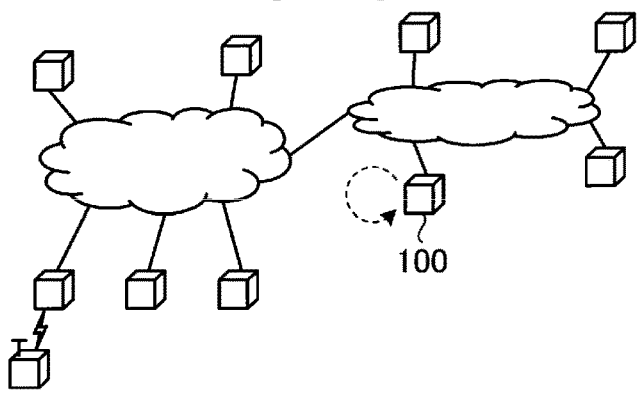
Figure 7D:
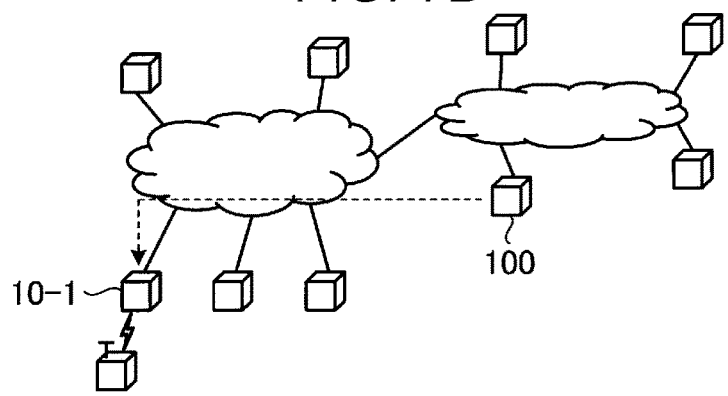

As illustrated in FIG. 7C and FIG. 7D, the management server 100 may perform a content disposition operation. That is, as indicated by a dashed line in FIG. 7C, if a new content is added from the origin server 6 or the cache server 4, the category determination unit 101 may determine a category of the content based on the similarity to the existing category. For example, in a case of video content, the video content may be classified based on information such as content and reproduction time of the video content. The category determination unit 101 may store the classified result as the classification information 110 in the storage unit 105.

The content disposition determination unit 104 may access the storage unit 105 and acquire the first correlation information 108. The content disposition determination unit 104 may specify a category and location information such that the access frequency of the first correlation information 108 satisfies the criterion. The content disposition determination unit 104 may generate the distribution management information 109 according to the result of specifying the category and the location information in which the access frequency satisfies the criterion.

As indicated by a dashed line in FIG. 7D, the content disposition determination unit 104 may store the distribution management information 109 in the storage unit 105 and store for example, the content A1 belonging to the specified category A in the cache area 14a of the access point 10-1 corresponding to the specified location information AP1 according to the distribution management information 109.

The new content can be disposed in the access point 10 which is highly likely to be accessed at a point of time of the addition, by the operations illustrated in FIG. 7A to FIG. 7D.

For example, if the contents A1 and A2 belonging to the category A have been previously stored in the cache area 14a of the access point 10-1, it is expected that a location of the access point 10-1 has a browsing requirement for the category A. If the new content A3 belonging to the category A is updated in the origin server 6 and/or the cache server 4, the management server 100 may perform the operations illustrated in FIG. 7A to FIG. 7D and store the new content A3 in the cache area 14a of the access point 10-1. Thereby, even if a sudden access request to the content A3 is issued to the access point 10-1 shortly after the new content A3 is added, the content A3 can be rapidly provided and deterioration of a distribution quality can be suppressed.

As described above, in the embodiment, the management server 100 may store the first correlation information 108 in which the category, the location information, and the access frequency of the content are correlated with each other, sequentially update the first correlation information according to the access information to the content, and store the content expected to be accessed according to the first correlation information 108 in the cache area 14a of the access point 10 corresponding to the location information. Thereby, the new content can be disposed in the access point 10 which is highly likely to be accessed at the point of time of the addition, and more efficient distribution of the content can be made.

Figure 8A:
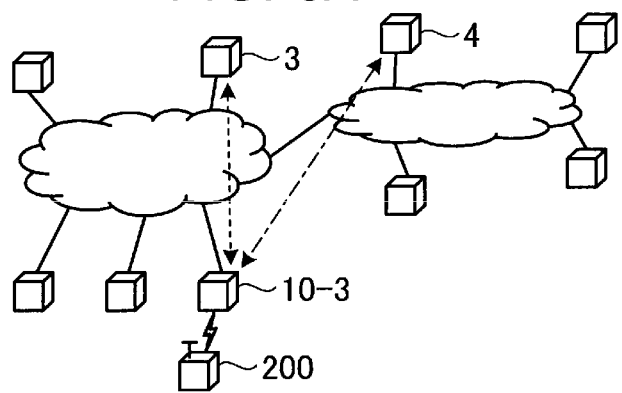
FIG. 8A to FIG. 8C are diagrams illustrating an operation for acquiring the location information of a plurality of access points according to a first modification example of the embodiment.
Figure 8B:
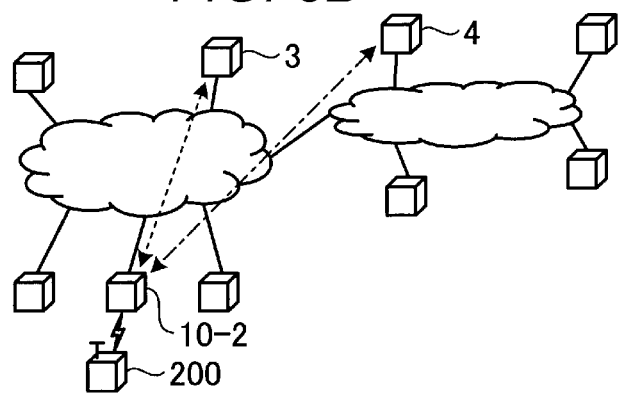
Figure 8C:
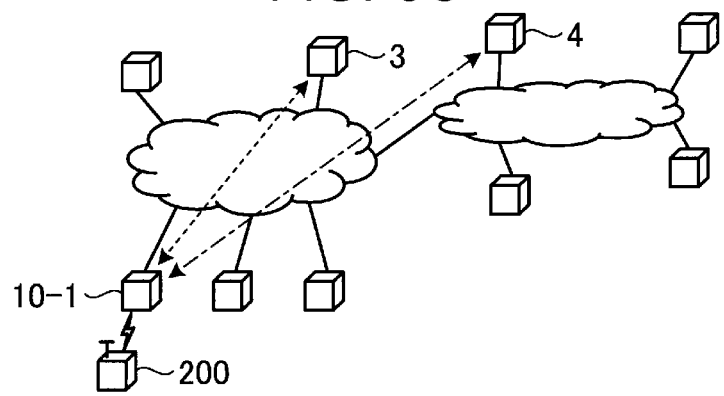

A locational relationship between the access points may be estimated from the location information of the access points. For example, if the wireless terminal 200 moves as illustrated in FIG. 8A to FIG. 8C, the location information management server 3 can acquire the location information of a plurality of the access points. FIG. 8A to FIG. 8C are diagrams illustrating an operation for acquiring the location information of the plurality of access points. As indicated by a dashed line arrow in FIG. 8A, the location information management server 3 can estimate the location information of the wireless terminal 200, based on at least one of the information obtained by a GPS function and the information of the access point 10-3 connected to the wireless terminal 200, thereby, acquiring the location information of the access point 10-3. As indicated by a dashed line arrow in FIG. 8B, the location information management server 3 can estimate the location information of the wireless terminal 200, based on at least one of the information obtained by the GPS function and the information of the access point 10-2 connected to the wireless terminal 200, thereby, acquiring the location information of the access point 10-2. As indicated by a dashed line arrow in FIG. 8C, the location information management server 3 can estimate the location information of the wireless terminal 200, based on at least one of the information obtained by the GPS function and the information of the access point 10-1 connected to the wireless terminal 200, thereby, acquiring the location information of the access point 10-1.

Figure 9A:
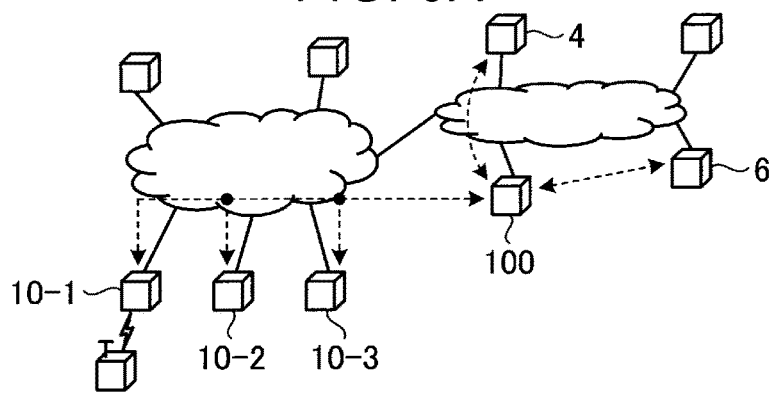
FIG. 9A to FIG. 9D are diagrams illustrating the operation of the management server according to the first modification example of the embodiment.
Figure 9B:
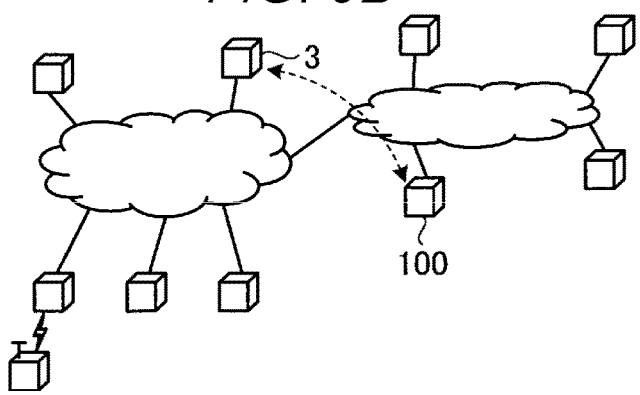

Thereby, in the location information collection operation illustrated in FIG. 9B, the location information list acquisition unit 103 of the management server 100 can acquire the location information of the respective access points 10-1 to 10-3 from the location information management server 3. Then, the location information list acquisition unit 103 may determine an adjacent access point for each access point, based on a preset physical distance threshold or the like, and store information on the determined access point in the storage unit 105 as second correlation information 113.

Alternatively, if the wireless terminal 200 moves as illustrated in FIG. 8A to FIG. 8C, the cache server 4 can acquire a plurality of pieces of access information corresponding to the plurality of access points. As indicated by an arrow of an alternate long and short dash line illustrated in FIG. 8A, the cache server 4 may record access information accessed from the wireless terminal 200 via the access point 10-3, and thereafter, as indicated by an arrow of an alternate long and short dash line illustrated in FIG. 8B, the cache server 4 may record access information accessed from the wireless terminal 200 via the access point 10-2, and thereafter, as indicated by an arrow of an alternate long and short dash line illustrated in FIG. 8C, the cache server 4 may record access information accessed from the wireless terminal 200 via the access point 10-1.

Thereby, in the category information list collection operation illustrated in FIG. 9A, the management server 100 may acquire a plurality of pieces of access information recorded respectively in FIG. 8A to FIG. 8C. The management server 100 may determine an adjacent access point for each access point from the fact that the wireless terminal 200 sequentially accesses the access points in order of the access point 10-3, the access point 10-2, and the access point 10-1, and stores the determined access point in the storage unit 105 as the second correlation information 113.

Figure 10:
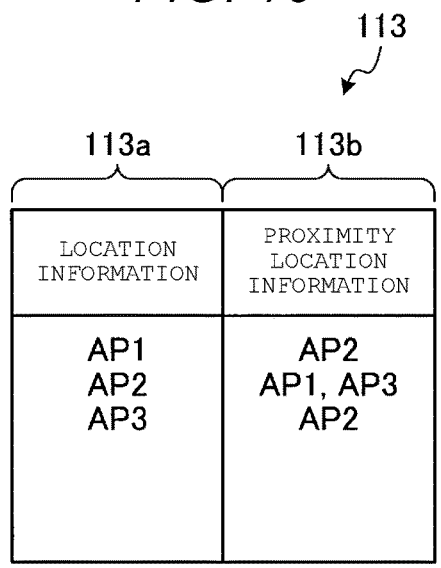
FIG. 10 is a diagram illustrating a data structure of second correlation information in the first modification example of the embodiment.

The second correlation information 113 has, for example, a data structure illustrated in FIG. 10. FIG. 10 is a diagram illustrating the data structure of the second correlation information 113. The second correlation information 113 may include a location information column 113a and a proximity location information column 113b. In the location information column 113a, information indicating a location of the wireless terminal may be recorded, and, for example, the identifiers AP1, AP2, AP3, and the like of the access points accessed by the wireless terminal may be recorded. The identifier AP1 is an identifier of the access point 10-1, the identifier AP2 is an identifier of the access point 10-2, and the identifier AP3 is an identifier of the access point 10-3. In the proximity location information column 113b, information indicating a location of the access point located closely may be recorded, and for example, the identifiers AP1, AP2, AP3, and the like of the access points accessed by the wireless terminal may be recorded.

By referring to the second correlation information 113, it is possible to grasp or determine the access point located closely to the access point corresponding to the location information. For example, it is possible to grasp or determine that the access point 10-2 corresponding to the identifier AP2 is located closely to the access point 10-1 corresponding to the identifier AP1. It is possible to grasp or determine that the access point 10-1 corresponding to the identifier AP1 and the access point 10-3 corresponding to the identifier AP3 are located closely to the access point 10-2 corresponding to the identifier AP2. It is possible to grasp or determine that the access point 10-2 corresponding to the identifier AP2 is located closely to the access point 10-3 corresponding to the identifier AP3.

Figure 9C:
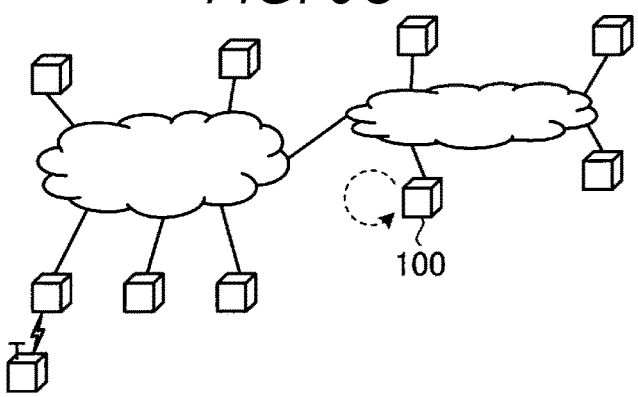
Figure 11A:
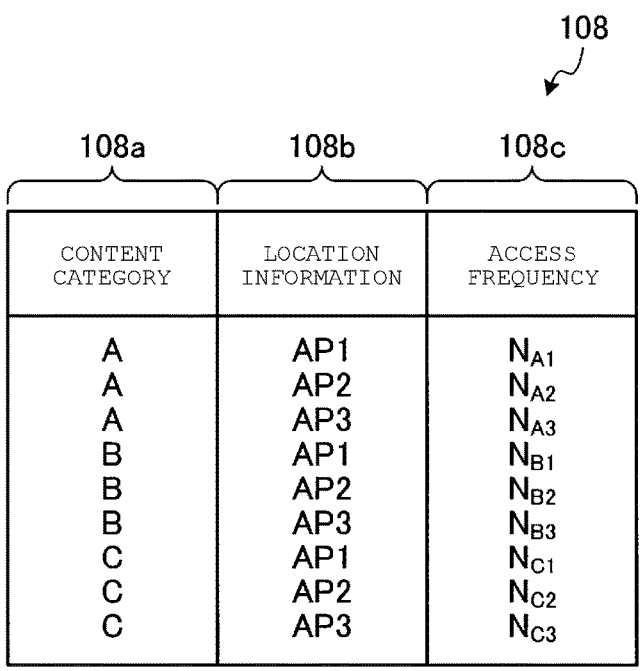
FIG. 11A and FIG. 11B are diagrams illustrating configurations of first correlation information and distribution management information according to the first modification example of the embodiment.
Figure 11B:
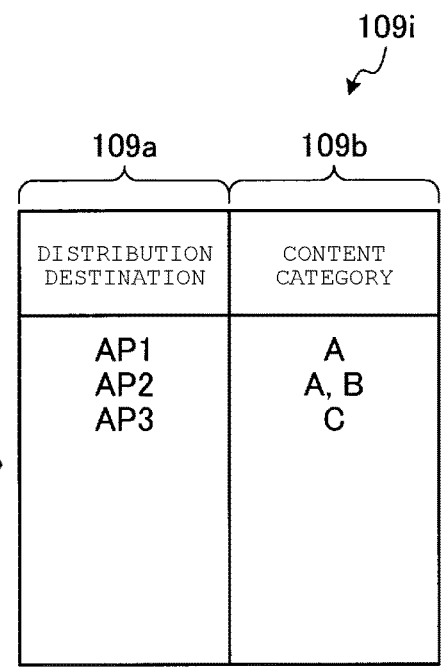

As indicated by a dashed line in FIG. 9C, the content disposition determination unit 104 may access the storage unit 105 and acquire the first correlation information 108 and the second correlation information 113. The content disposition determination unit 104 may specify a category and location information such that an access frequency of the first correlation information 108 satisfies a criterion. The content disposition determination unit 104 may generate distribution management information 109i illustrated in FIG. 11B according to the result of specifying the category and the location information that the access frequency satisfies the criterion and the second correlation information 113. That is, the distribution management information 109i may be generated such that the identifier AP2 indicating the access point 10-2 located in the vicinity of the access point 10-1 is determined as a distribution destination of the category A, in addition to the identifier AP1 indicating the access point 10-1 (see FIG. 11B).

Figure 9D:
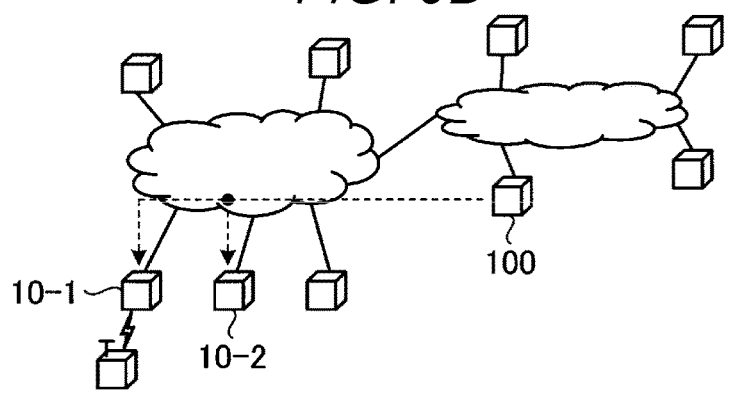

Then, as illustrated in FIG. 9D, the content disposition determination unit 104 of the management server 100 can dispose the new content A3 in the access point 10-1 where the contents A1 and A2 of the category A have been previously disposed, and the access point 10-3 adjacent thereto, according to the distribution management information 109i.

In this way, it is possible to dispose new content in the access point which is highly likely to be accessed in a wide range at a point of time when new content is added. Accordingly, even if the wireless terminal 200 moves, it is possible to prevent deterioration of a distribution quality.

Alternatively, the management server 100 may acquire a communication attribute which is determined from connection time of a terminal, an intensity of a communication radio wave, and the like and may manage the distribution of the content in consideration of the communication attribute. That is, the management server 100 can extract information indicating the communication attribute from the access information (e.g., log information) acquired from the origin server 6 and/or the cache server 4. When new content is added, a manager may designate or specify a communication attribute to which the manager wishes to appeal for the new content. The management server 100 not only can dispose the content according to a similarity between the new content and the existing content or a location of the access point, but also can add the content to the access point around the terminal satisfying the communication attribute to which the manager wishes to appeal, based on the extracted communication attribute and the specified communication attribute.

In addition, by holding the communication attribute for each time period, it is possible to dispose the content in advance in the access point which is highly likely to satisfy the communication attribute in the near future, or to stand by until the content is disposed in a case where there is an access point that is insufficient to hold the terminal satisfying the communication attribute to which the manager wishes to appeal when new content is added, or the like.

In this case, first correlation information 108*j* has, for example, a data structure illustrated in FIG. 12A. FIG. 12A is a diagram illustrating the data structure of the first correlation information 108*j*. The first correlation information 108*j* may include a content category column 108*a*, a location information column 108*b*, a communication attribute column 108*d*, and an access frequency column 108*c*. In the communication attribute column 108*d*, communication attributes (e.g., connection time, intensity of communication radio wave, and the like) of an access point accessed by a wireless terminal are recorded, and, for example, communication attributes CA1, CA2, CA3 may be recorded. By referring to the first correlation information 108*j*, it is possible to grasp or determine an access frequency (e.g., the number of times of access) corresponding to each combination of the content category, the location information, and the communication attribute. For example, it is possible to grasp or determine that the access frequency for a combination of the content category A, the location information AP1, and the communication attribute CA1 is $N_{A11}$ (times), . . . , the access frequency for a combination of the content category C, the location information AP3, and the communication attribute CA3 is $N_{C33}$ (times).

By using the first correlation information 108*j*, the management server 100 can schedule a time period for distributing the content for each distribution destination and can generate distribution management information 109*j* including the schedule.

The distribution management information 109*j* may have, for example, a data structure illustrated in FIG. 12B. FIG. 12B is a diagram illustrating the data structure of the distribution management information 109*j*. The distribution management information 109*j* may include a distribution destination column 109*a*, a content category column 109*b*, and a distribution time 109*c*. In the distribution time 109*c*, the time at which the content has to be distributed to the distribution destination is recorded, and, for example, t1 to t2, t3 to t4, t5 to t6, and the like may be recorded. By referring to the distribution management information 109*j*, it is understood that the content belonging to the category A has to be distributed to the access point 10-1 corresponding to the identifier AP1 at the times t1 to t2. It is understood that the contents belonging to the categories A and B have to be distributed to the access point 10-2 corresponding to the identifier AP2 at the times t3 to t4. It is understood that the content belonging to the category C has to be distributed to the access point 10-3 corresponding to the identifier AP3 at the times t5 to t6.

Thus, it is possible for distribution to target a time period in which access is highly likely and an access point at which access from a wide area is highly likely when new contents are added. Accordingly, it is possible to suppress deterioration of a distribution quality while reducing content distribution cost, if distribution of the new content is charged, or the like.

In addition, if there are particularly many terminals satisfying the communication attribute to which the manager wishes to appeal, by adding a content reproduction device that is different from the terminal and can be operated from the access point, additional content can be automatically reproduced by the content reproduction device, and thereby, it is possible to attract even more users to the content.

Alternatively, the management server 100 may acquire user attributes such as sex, age, preference, and the like of the user who uses the terminal, and manage distribution of the content in consideration of the user attributes.

Figure 13A:
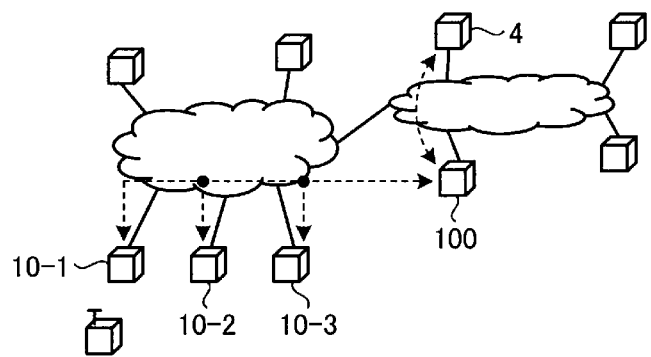
FIG. 13A to FIG. 13E are diagrams illustrating an operation of a management server according to a third modification example of the embodiment.
Figure 13B:
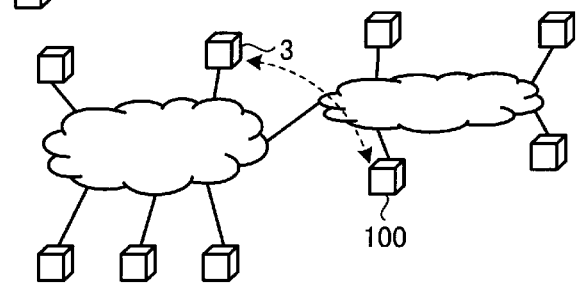
Figure 13C:
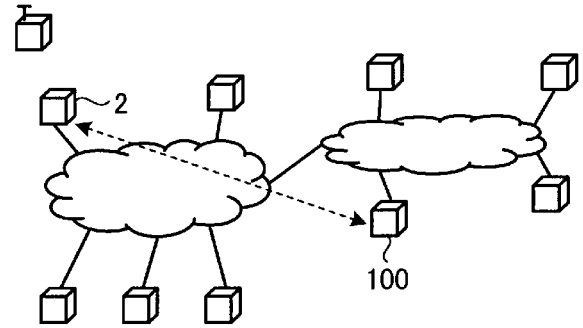
Figure 13D:
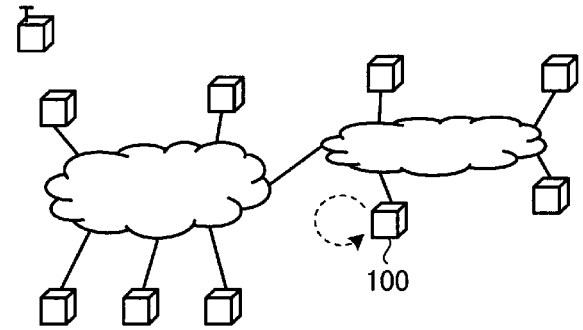
Figure 13E:
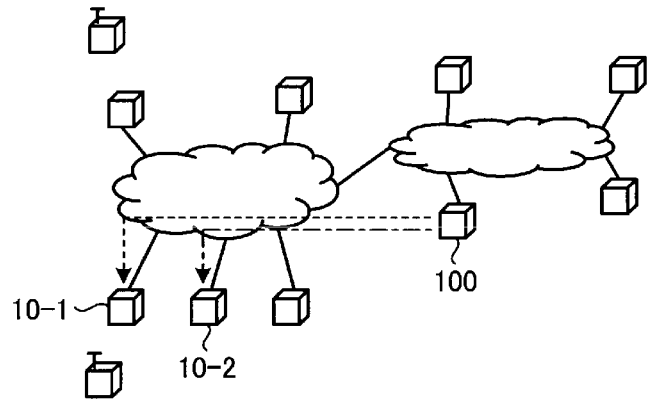

For example, when new content is added, the management server 100 may perform a category information list collection operation illustrated in FIG. 13A, perform a location information collection operation illustrated in FIG. 13B, and then, perform a user attribute collection operation illustrated in FIG. 13C. That is, the management server 100 can acquire information indicating the user attributes (e.g., sex, age, preference, and the like of the user) from the authentication server 2. When the new content is added, a manager may designate or specify the user attributes to which the manager wishes to appeal for the new content. The management server 100 not only can dispose the content according to a similarity between the new content and the existing content or a location of the access point but also can add the content to the access point around the terminal satisfying the user attribute to which the manager wishes to appeal, based on the acquired communication attribute and the specified communication attribute.

In addition, by holding the user attribute for each time period, it is possible to dispose the content in advance in the access point which is highly likely to satisfy the user attribute in the near future, or to stand by until the content is disposed in a case where there is an access point that is insufficient to hold the terminal satisfying the user attribute to which the manager wishes to appeal when new content is added, or the like.

In this case, first correlation information 108*k* may have, for example, a data structure illustrated in FIG. 14A. FIG. 14A is a diagram illustrating the data structure of the first correlation information 108*k*. The first correlation information 108*k* may include the content category column 108*a*, the location information column 108*b*, a user attribute column 108*e*, and the access frequency column 108*c*. In the user attribute column 108*e*, the user attributes (e.g., sex, age, preference, and the like of the user) of the user which uses the access point accessed by the wireless terminal may be recorded and, for example, the communication attributes a, b, and c may be recorded there. By referring to the first correlation information 108*k*, it is possible to grasp or determine the access frequency (e.g., the number of times of access) corresponding to each combination of the content category, the location information, and the user attribute. For example, it is possible to grasp or determine that the access frequency for a combination of the content category A, the location information AP1, and the user attribute a is $N_{A1a}$ (times), . . . , the access frequency for a combination of the content category C, the location information AP3, and the user attribute c is $N_{C3c}$ (times).

By using the first correlation information 108*k*, the management server 100 can schedule a time period for distributing the content for each distribution destination, and can generate distribution management information 109*k* including the schedule.

The distribution management information 109*k* may have, for example, a data structure illustrated in FIG. 14B. FIG. 14B is a diagram illustrating the data structure of the distribution management information 109*k*. The distribution management information 109*k* may include the distribution destination column 109*a*, the content category column 109*b*, and the distribution time 109*c*. In the distribution time 109*c*, the time at which the content has to be distributed to a distribution destination may be recorded, and, for example, t11 to t12, t13 to t14, t15 to t16, and the like may be recorded. By referring to the distribution management information 109*k*, it is understood that the content belonging to the category A has to be distributed to the access point 10-1 corresponding to the identifier AP1 at the times t11 to t12.

It is understood that the contents belonging to the categories A and B have to be distributed to the access point 10-2 corresponding to identifier AP2 at the times t13 to t14. It is understood that the content belonging to the category C has to be distributed to the access point 10-3 corresponding to the identifier AP3 at the times t15 to t16.

Thus, it is possible for distribution to target a time period in which access is highly likely and an access point at which access from a wide area is highly likely when new contents are added. Accordingly, it is possible to suppress deterioration of a distribution quality while suppressing a distribution cost of the content, for example, if distribution of the new content is charged, or the like.

In addition, by adding a content reproduction device that is different from the terminal and can be operated from the access point, the additional content can be automatically reproduced by the content reproduction device, even more users can be attracted to the content, if there are particularly many terminals satisfying the user attribute to which a manager wishes to appeal.

In addition, for the user attribute, a camera or the like may be mounted on the access point without using the authentication server 2, an average person image around the access point may be calculated, and the calculated person image may be used as the user attribute of the terminal connected to the access point. By using this method, the authentication server 2 may become unnecessary, and thus, it is possible to reduce a cost of a system.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A system comprising:
a processor; and
a memory configured to store first correlation information in which (1) a category into which content is classified among a plurality of categories, (2) an identifier of an access point among a plurality of managed access points, (3) an access frequency and (4) a communication attribute among a plurality of communication attributes are correlated with one another, each of the plurality of communication attributes including a connection time and an intensity of communication radio wave,
wherein the processor is configured to
acquire (1) access information on an access from a wireless terminal to a content server via an accessed access point and a network, (2) a content which is requested by the wireless terminal, (3) an identifier of the accessed access point and (4) a communication attribute of the accessed access point, the acquired communication attribute comprising a connection time and an intensity of communication radio wave of the accessed access point,
update the first correlation information according to the access information by rewriting the access frequency corresponding to (1) a category to which the requested content belongs, (2) the acquired identifier and (3) the acquired communication attribute,
specify a first category, a first identifier, and a first communication attribute such that an access frequency related to (1) the first category, (2) the first identifier and (3) the first communication attribute in the updated first correlation information satisfies a criterion, and
store a first content belonging to the first category in a cache area of a first access point corresponding to the first identifier in accordance with the first communication attribute, the first communication attribute comprising a first connection time and a first intensity of communication radio wave of the first access point.

2. The system according to claim 1,
wherein the identifier in the first correlation information includes information indicating a location of an access point.

3. The system according to claim 2,
wherein the memory further stores second correlation information in which (1) an identifier of a particular access point among the plurality of managed access points and (2) proximity location information indicating a location of an access point close to a location of the particular access point are correlated with each other, and
wherein the processor is further configured to specify a second access point that is located around the first access point, according to the first identifier and the second correlation information, and store a second content belonging to the first category in a cache area of the second access point.

4. The system according to claim 3,
wherein the processor is further configured to:
acquire a plurality of pieces of access information on accesses from the wireless terminal to a content server via a plurality of access points and a network at a different time, and
create the second correlation information using the plurality of pieces of access information and store the created information in the memory.

5. A system comprising:
a processor; and
a memory configured to store first correlation information in which (1) a category into which content is classified among a plurality of categories, (2) an identifier of an access point among a plurality of managed access points, (3) an access frequency, and (4) a communication attribute among a plurality of communication attributes are correlated with one another, and
wherein the processor is further configured to:
acquire (1) access information on an access from a wireless terminal to a content server via an accessed access point and a network, (2) a content which is requested by the wireless terminal, and (3) an identifier of the accessed access point,
acquire a communication attribute of the accessed access point, the acquired communication attribute comprising a connection time and an intensity of communication radio wave of the accessed access point,
update the first correlation information according to the access information by rewriting the access frequency corresponding to (1) the category to which the requested content belongs, (2) the acquired identifier, and (3) the acquired communication attribute,
specify a first category, a first identifier, and a first communication attribute such that an access frequency related to (1) the first category, (2) the first identifier and (3) the first communication attribute in the updated first correlation information satisfies a criterion, and store a first content belonging to the first category in a cache area of the first access point corresponding to the first identifier in accordance with the first communication attribute, the first communication attribute comprising a first connection time and a first intensity of communication radio wave of the first access point.

6. The system according to claim 1, wherein in the first correlation information, a category among the plurality of categories, an identifier among identifiers of the plurality of managed access points, an access frequency, and a user attribute among a plurality of user attributes are correlated with one another, and, wherein the processor is further configured to:

acquire the access information, the requested content, the identifier of the accessed access point, and a user attribute of the accessed access point, update the first correlation information by rewriting the access frequency corresponding to the category to which the requested content belongs, the acquired identifier, and the acquired user attribute, according to the access information, specify the first category, the first identifier, and a first user attribute such that an access frequency related to the first category, the first identifier and the first user attribute in the updated first correlation information satisfies the criterion, and store the first content belonging to the first category in the cache area of the first access point corresponding to the first identifier in accordance with the user attribute.

7. The system according to claim 1, wherein the processor is configured to acquire the communication attribute of the accessed access point from at least one of the content server or the accessed access point.

8. A content management method comprising:

storing, in a storage, first correlation information in which (1) a category into which content is classified among a plurality of categories, (2) an identifier of an access point among a plurality of managed access points, (3) an access frequency are correlated with one another, each of the plurality of communication attributes including a connection time and an intensity of communication radio wave;

acquiring, by a processor, (1) access information on an access from a wireless terminal to a content server via an accessed access point and a network, (2) a content which is requested by the wireless terminal, (3) an identifier of the accessed access point and (4) a communication attribute of the accessed access point, the acquired communication attribute comprising a connection time and an intensity of communication radio wave of the accessed access point;

updating, by the processor, the first correlation information according to the access information by rewriting the access frequency corresponding to (1) a category to which the requested content belongs, (2) the acquired identifier and (3) the acquired communication attribute;

specifying, by the processor, a first category, a first identifier, and a first communication attribute such that an access frequency related to (1) the first category, (2) the first identifier and (3) the first communication attribute in the updated first correlation information satisfies a criterion; and storing, by the processor, a first content belonging to the first category in a cache area of a first access point corresponding to the first identifier in accordance with the first communication attribute, the first communication attribute comprising a first connection time and a first intensity of communication radio wave of the first access point.

9. The content management method according to claim 8, wherein the identifier in the first correlation information includes information indicating a location of an access point.

10. The content management method according to claim 9, further comprising:

storing, in the storage, second correlation information in which (1) an identifier of a particular access point among the plurality of managed access points and (2) proximity location information indicating a location of an access point close to a location of the particular access point are correlated with each other;

specifying, by the processor, a second access point that is located around the first access point, according to the first identifier and the second correlation information; and storing, by the processor, a second content belonging to the first category in a cache area of the second access point.

11. The content management method according to claim 10, acquiring, by the processor, a plurality of pieces of access information on accesses from the wireless terminal to a content server via a plurality of access points and a network at a different time; and creating, by the processor, the second correlation information using the plurality of pieces of access information and store the created information in the storage.

12. The content management method according to claim 8, wherein in the first correlation information, a category among the plurality of categories, an identifier among identifiers of the plurality of managed access points, an access frequency, and a communication attribute among a plurality of communication attributes are correlated with one another, and wherein the method further comprises:

acquiring, by the processor, the access information, the requested content, the identifier of the accessed access point, and a communication attribute of the accessed access point;

updating, by the processor, the first correlation information by rewriting the access frequency corresponding to the category to which the requested content belongs, the acquired identifier, and the acquired communication attribute, according to the access information;

specifying, by the processor, the first category, the first identifier, and a first communication attribute such that an access frequency related to the first category, the first identifier and the first communication attribute in the updated first correlation information satisfies a criterion; and storing, by the processor, the first content belonging to the first category in the cache area of the first access point corresponding to the first identifier in accordance with the communication attribute.

13. The content management method according to claim 8, wherein in the first correlation information, a category among the plurality of categories, an identifier among identifiers of the plurality of managed access points, an access frequency, and a user attribute among a plurality of user attributes are correlated with one another, and, wherein the method further comprises:

acquiring, by the processor, the access information, the requested content, the location information corresponding to the accessed access point, and a user attribute of the accessed access point;

updating, by the processor, the first correlation information by rewriting the access frequency corresponding to the category to which the requested content belongs, the acquired identifier, and the acquired user attribute, according to the access information;

specifying, by the processor, the first category, the first identifier, and a first user attribute such that an access frequency related to the first category, the first identifier and the first user attribute in the updated first correlation information satisfies the criterion; and storing, by the processor, the first content belonging to the first category in the cache area of the first access point corresponding to the first identifier in accordance with the user attribute.

14. The content management method according to claim 8, wherein the communication attribute of the accessed access point is acquired from at least one of the content server or the accessed access point.

15. A non-transitory computer readable medium storing therein a content management program which, when executed by a processor of a computer performs a method comprising:

storing, in a storage, first correlation information in which (1) a category into which content is classified among a plurality of categories, (2) an identifier of an access point among a plurality of managed access points, (3) an access frequency are correlated with one another, each of the plurality of communication attributes including a connection time and an intensity of communication radio wave;

acquiring (1) access information on an access from a wireless terminal to a content server via an accessed access point and a network, (2) a content which is requested by the wireless terminal, (3) an identifier of the accessed access point and (4) a communication attribute of the accessed access point, the acquired communication attribute comprising a connection time and an intensity of communication radio wave of the accessed access point;

updating the first correlation information according to the access information by rewriting the access frequency corresponding to (1) a category to which the requested content belongs, (2) the acquired identifier and (3) the acquired communication attribute;

specifying a first category, a first identifier, and a first communication attribute such that an access frequency related to (1) the first category, (2) the first identifier and (3) the first communication attribute in the updated first correlation information satisfies a criterion; and storing a first content belonging to the first category in a cache area of a first access point corresponding to the first identifier in accordance with the first communication attribute, the first communication attribute comprising a first connection time and a first intensity of communication radio wave of the first access point.

16. The non-transitory computer readable medium according to claim 15, wherein the identifier in the first correlation information includes information indicating a location of an access point.

17. The non-transitory computer readable medium according to claim 16, where the method further comprises:

storing, in the storage, second correlation information in which (1) an identifier of a particular access point among plurality of managed access points and (2) proximity location information indicating a location of an access point close to a location of the particular access point are correlated with each other;

specifying a second access point that is located around the first access point, according to the first identifier and the second correlation information; and storing a second content belonging to the first category in a cache area of the second access point.

18. The non-transitory computer readable medium according to claim 15, wherein in the first correlation information, a category among the plurality of categories, an identifier among identifiers of the plurality of managed access points, an access frequency, and a communication attribute among a plurality of communication attributes are correlated with one another, and wherein the method further comprises:

acquiring the access information, the requested content, the identifier of the accessed access point, and a communication attribute of the accessed access point;

updating the first correlation information by rewriting the access frequency corresponding to the category to which the requested content belongs, the acquired identifier, and the acquired communication attribute, according to the access information;

specifying the first category, the first identifier, and a first communication attribute such that an access frequency related to the first category, the first identifier and the first communication attribute in the updated first correlation information satisfies a criterion; and storing the first content belonging to the first category in the cache area of the first access point corresponding to the first identifier in accordance with the communication attribute.

19. The non-transitory computer readable medium according to claim 15, wherein in the first correlation information, a category among the plurality of categories, an identifier among identifiers of the plurality of managed access points, an access frequency, and a user attribute among a plurality of user attributes are correlated with one another, and, wherein the method further comprises:

acquiring the access information, the requested content, the identifier of the accessed access point, and a user attribute of the accessed access point;

updating the first correlation information by rewriting the access frequency corresponding to the category to which the requested content belongs, the acquired identifier, and the acquired user attribute, according to the access information;

specifying the first category, the first identifier, and a first user attribute such that an access frequency related to the first category, the first identifier and the first user attribute in the updated first correlation information satisfies the criterion; and storing the first content belonging to the first category in the cache area of the first access point corresponding to the first identifier in accordance with the user attribute.

20. The non-transitory computer readable medium according to claim 15, wherein the method further comprises:
  acquiring a plurality of pieces of access information on accesses from the wireless terminal to a content server via a plurality of access points and a network at a different time; and
  creating the second correlation information using the plurality of pieces of access information and store the created information in the storage.

* * * * *